Figure 1:
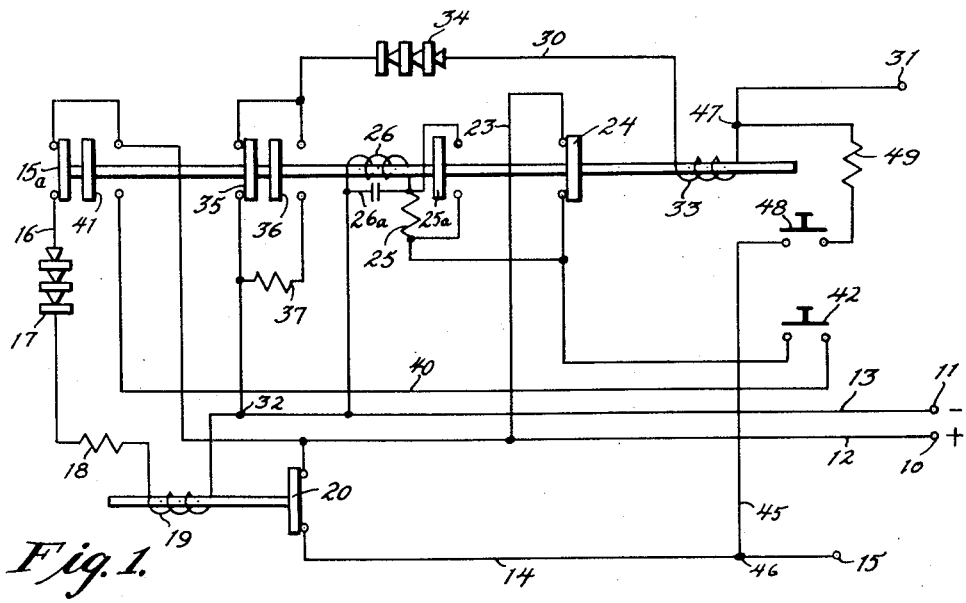

Dec. 15, 1959  A. E. PICKARD  2,917,673
GROUND FAULT DETECTOR
Filed Jan. 7, 1957

INVENTOR.
ALFRED E. PICKARD
BY
Robertson and Gautier
ATTORNEYS.

… …

2,917,673
GROUND FAULT DETECTOR
Alfred E. Pickard, Mount Vernon, Ill.

Application January 7, 1957, Serial No. 632,811

9 Claims. (Cl. 317—18)

This invention relates generally to electrical protective system, and is particularly directed to such a system for use in conjunction with electrical industrial and mining equipment.

The particular embodiment of the present invention, which is illustrated in the drawings and which will be described hereinafter in greater detail, comprises generally a relay for holding the electrical apparatus to be operated in closed circuit across a supply source, and a relay connected between the conductive frame of the apparatus and one side of the supply source and responsive to a fault voltage on the frame to effect de-energization of the first mentioned holding relay, and thereby open the apparatus circuit.

While the subject device has been primarily developed and employed for use with industrial and mining apparatus, and will be described hereinafter with particular reference thereto, it is understood that the instant invention is capable of many various applications, all of which are intended to be comprehended herein.

It is one object of the present invention to provide a device of the type described which is adapted to be relatively small and compact for easy installation in existing equipment, which is durable in construction and reliable in operation, and which can be manufactured, installed and maintained at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 2:
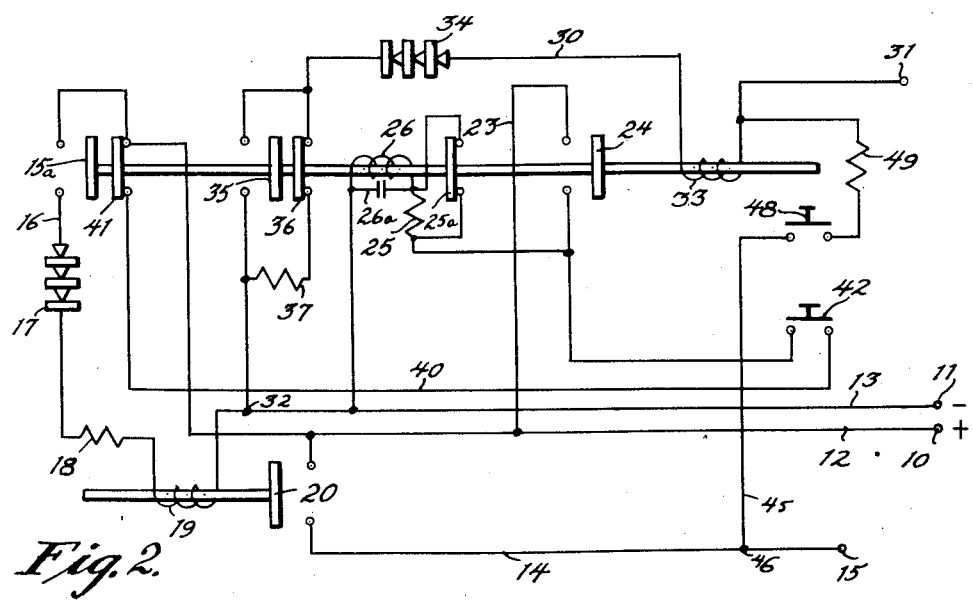

In the drawings:

Figure 1 is a schematic representation of the electrical system of the present invention in a normal operating condition; and Figure 2 schematically illustrates the system of Figure 1 in operation under a fault condition.

Referring now more particularly to the drawings, and specifically to Figure 1 thereof, plus and minus terminals of a supply source are designated 10 and 11, respectively; and, conductors 12 and 13 extend from the respective terminals. A conductor or control line 14 is connected to the positive supply line 10 through normally closed contacts 20 and is adapted for connection at 15 to an electrical device or apparatus to be operated. The operated apparatus, which is not shown as it forms no part of the present invention, may have its other side connected to the minus supply line 11 if desired.

Connected to and extending from the positive supply line 12, through normally closed contacts 15a, is a conductor 16 which is connected with the negative supply line 11. Successively connected in series in the conductor 16, so as to be across the supply source, are a rectifier 17, resistance 18 and relay 19. The relay 19 includes the normally closed contacts 20 in the apparatus control line 14, and serves to hold the latter contacts closed when the relay is energized. Thus, an apparatus holding circuit is defined by the conductors 12 and 16, contacts 15a, rectifier 17, resistance 18, relay 19, and conductor 13, which circuit is in parallel with the apparatus control circuit 14 across the supply source.

Also connected to the positive supply line 12 is one end of a conductor 23. Series connected in the conductor 23 are normally closed contacts 24, a resistance 25, and a relay or relay coil 26, from which the conductor extends to the negative supply line 13. An operating circuit connected across the power source and in parallel with the holding circuit of conductor 16, and the control circuit of conductor 14, is thus defined by the conductor 23 and its series connected normally closed contacts 24, resistance 25 and operating relay 26. As is apparent, the relay 26 operates to control the contacts 24.

A fault detecting circuit is defined by a conductor 30 which has one end 31 secured fast to the electrically conductive frame of the apparatus being operated, and has its other end connected, as at 32, to the minus supply line 13. Connected in series in the conductor 30 are a relay or relay coil 33, and a rectifier 34. Also connected in the fault detecting circuit 30 are normally closed contacts 35, and normally open contacts 36, which contacts are connected in parallel with each other and in series with the relay 33 and rectifier 34. In addition, a resistance 37 is connected in series with the normally open contacts 36 and in parallel with the normally closed contacts 35. As will appear more fully hereinafter, the relay coil 33 of the fault detecting circuit 30 and the relay 26 of the operating circuit 23 are operative to control the hereinbefore mentioned contacts 24, 36, 35 and 15a.

A reset circuit includes a conductor 40 and normally open contacts 41 adapted, when closed, to electrically connect one end of the conductor 40 to the positive supply line 12. The conductor 40 is provided with a normally open reset switch 42 and connected at its other end to the operating circuit 23 to define a circuit in parallel with the normally closed contacts 24 of the operating circuit. As is apparent in the drawings, the contacts 41 and 36 are closed only when the contacts 24, 35 and 15a are open. A time-delay condenser 26a is connected in parallel with the relay coil 26, while normally open contacts 25a are connected in parallel with the resistance 25 and adapted to be closed when contacts 41 and 36 are closed.

It may now be understood that the reset circuit 40 includes in series normally open contacts 41 and a normally open reset switch 42 and is connected in parallel series with the operating circuit 23, being in parallel with the normally closed contacts 24 and in series with the resistance 25 and relay 26.

A test circuit is defined by a conductor or line 45 connected at 46 to the positive control line 14 and having its other end connected through a juncture 47 to the frame terminal 31 being tested. Interposed in series connection in the test circuit 45 are a normally open test switch 48, and a resistance 49.

In normal operation, without a fault potential at the frame connection 31, the fault detecting circuit 30 and its relay 33 are inactive or de-energized, and the contacts 15a, 35 and 24 are in their normally closed condition and the contacts 25a, 36 and 41 in their normally open condition. The control circuit 23 is thus in closed condition across the supply lines 12 and 13 and the control relay 26 is energized to hold the contacts 15a, 35 and 24 in their normally closed condition. Resistance 25 in normal operation serves to limit the current to relay 26.

As contacts 15a are closed, the holding circuit 16, through the rectifier 17, resistance 18 and relay 19 is closed across the positive and negative supply lines 12 and 13. That is, current limited by the resistance 18 passes through the holding circuit 16 in the direction determined by the rectifier 17 to energize the relay 19 and hold the control circuit contacts 20 closed for normal operation of mining machinery, or the like.

In the event of fault occurring at the apparatus being operated which raises the frame potential to a predetermined voltage above ground, current passes through the fault detecting circuit 30, in the direction permitted by the rectifier 34, to the minus supply line 13. This energizes the fault detector relay 33 which is effective to open the normally closed contacts 24, 35 and 15a and close the normally open contacts 25a, 36 and 41. That is, the operating relay 26 is responsive to normal current in the operating circuit 23 to hold the normally closed contacts 24, 35 and 15a closed, while the fault detecting relay 33 is sufficiently strong when energized by a pre-determined fault voltage to overcome the operating relay and open the normally closed contacts. Of course, opening of the contacts 24 in the operating circuit 23 de-energizes the operating relay 26, so that the latter does not tend to close its normally closed contacts under fault conditions. Upon opening of the normally closed contacts 15a by the relay 33 under a fault condition, the holding circuit 16 is open and its holding relay 19 is de-energized to open the normally closed contacts 20 of the control line 14. In this manner, a fault potential on the machine frame serves to open the machine control circuit.

Upon opening of the normally closed contacts 24, 35 and 15a under ground fault conditions, the ground fault relay 33 operates to close the normally open contacts 25a, 41 and 36. Upon opening of the contacts 35 and closure of the contacts 36 under ground fault condition, the fault voltage will be impressed on the resistance 37. By this means the fault detecting relay 33 may be actuated at a relatively low voltage, say from 35 to 40 volts, and can still operate satisfactorily at a relatively high voltage, say 270 volts in the event of ground fault at line potential.

Closure of the normally open reset circuit contacts 41 under fault conditions serves to place the reset circuit in series with the parallel connected condenser 26a and operating relay 26, and in series with the parallel connected closed contacts 25a and the resistance 25 across the supply lines 12 and 13; and, upon closure of the reset switch 42, supply line current passes through the operating relay 26 and contacts 25a to urge the normally closed contacts 24, 35 and 15a toward their closed condition. In the absence of a ground fault energizing the relay 33, depression of the reset switch 42 in the condition of Figure 2 will effect return of the normally closed contacts to their normally closed condition of Figure 1, whereupon the operating relay will be energized through the operating circuit 23 and the holding relay 19 will be energized through its circuit 16 to hold the control line 14 closed. Should a relatively high voltage remain at the terminal 31 during an attempt to reset, the capacitor 26a will charge and prevent chattering of the relays 26 and 19. Of course, the closed contacts 25a permit a higher current surge to insure resetting and insert resistance 25 into the circuit.

If it is desired to test the system under the normal operating conditions of Figure 1, it is only necessary to depress the test button 48, whereby a voltage from the control line 14 will be applied to the test resistor 49, and a reduced voltage applied at 47 to the fault detecting relay 33. If the system is operating satisfactorily, the contacts 24, 35 and 15a will be opened by the relay 33 and cause the operating relay 26 and holding relay 19 to drop out, whereupon the control line 14 will be opened.

The rectifiers 34 and 17 in the fault detecting and holding circuits 30 and 16, respectively, prevent apparatus from being operated with reversed polarity.

From the foregoing, it is seen that the present invention provides a protective system for electrical apparatus which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An electrical protective system for electrical apparatus having a conductive frame and adapted to be connected across an electric supply source, said system comprising a holding circuit adapted to be connected across said source in parallel with said apparatus, a relay in said holding circuit responsive to opening of said holding circuit to open the parallel connection of said apparatus to said source, an operating circuit connected across said source in parallel with said apparatus and said holding circuit, a relay in said operating circuit responsive to normal current in said operating circuit to hold said holding and operating circuits closed, said holding circuit relay thereby holding the apparatus connection to said source closed in normal operation, a fault detecting circuit connected between said frame and the negative side of said source, and a relay in said fault detecting circuit responsive to a fault voltage on said frame to open said holding and operating circuits and deenergizing said operating circuit relay, whereby said holding circuit relay opens the connection of said apparatus to said source.

2. A system according to claim 1, in combination with a test circuit electrically connected between the positive side of said source and the frame end of said fault detecting circuit, and a normally open switch in said test circuit, closure of said test circuit switch serving to pass current to the frame end of and through said fault detecting circuit to effect consequent opening of said apparatus connection to said source.

3. A system according to claim 1, in combination with a normally open reset circuit connected in parallel with the switch of said operating circuit relay and in series with the coil of said operating circuit relay and having contacts normally held open by energization of said operating circuit relay, said contacts being operatively connected to said fault detecting circuit relay to be closed by energization of said fault detecting circuit relay which opens said holding and operating circuits, and a normally open reset switch in said reset circuit, closure of said reset switch when the normally open contacts of said reset circuit have been closed by said fault detecting circuit serving to energize said operating circuit relay to close said holding and operating circuits and open said reset circuit contacts, except when said fault detecting circuit relay is energized by a fault potential.

4. A system according to claim 1, in combination with rectifiers in said holding and fault detecting circuits to permit the flow of current therethrough in only one direction.

5. A system according to claim 1, said fault detecting circuit including a pair of contacts normally held closed by energization of said operating circuit relay, a pair of contacts in parallel with said normally closed fault detecting circuit contacts and normally held open by energization of said operating circuit relay, a resistance in series with said normally open contacts, and means responsive to energization of said fault detecting circuit relay for opening said normally closed fault detecting circuit contacts and closing said normally opened fault detecting circuit contacts when said operating circuit is opened to place said resistance in series with said fault detecting circuit relay when current passes through the latter, whereby said fault detecting circuit relay is adapted to be actuated by relatively low voltage and operate satisfactorily at relatively high voltage.

6. In an electrical protective system for electric apparatus having a conductive frame and adapted to be connected across an electric supply source, said system comprising a normally energized apparatus holding relay connected across said source for holding said apparatus in closed circuit across said source and responsive to de-energization to interrupt current to said apparatus, a normally energized operating relay connected across said source to hold said apparatus holding relay in closed circuit across said source and having normally closed contacts in series with itself which are held closed by energization of said operating relay, a normally de-energized fault detecting relay connected between said frame and one side of said source and responsive to a fault voltage in said frame to open said operating relay contacts and interrupt current to said apparatus holding relay, and a re-set circuit connected across the normally closed contacts of said operating relay and including normally open contacts operatively connected to said fault detecting relay to be closed by energization of said fault detecting relay when current is interrupted in said apparatus holding relay and said normally closed operating relay contacts are opened to place said operating relay in series with said re-set circuit across said source, and a normally open re-set switch in said re-set circuit, closure of said re-set switch when said re-set circuit contacts are closed serving to energize said operating relay which returns said apparatus holding relay to its closed circuit condition and returns said normally closed operating relay contacts to their closed condition, except when said fault detecting relay is energized.

7. A system according to claim 6, in combination with a test circuit electrically connected between the other side of said source and the frame end of said fault detecting circuit, and a normally open switch in said test circuit, closure of said test circuit switch serving to pass current to the frame end of and through said fault detecting relay and effect consequent deenergization of said apparatus holding relay.

8. A system according to claim 6, in combination with rectifiers in series with said apparatus holding and fault detecting relays to permit the passage of current therethrough in only one direction.

9. A system according to claim 6, in combination with a pair of normally closed contacts connected in series with said fault detecting relay, a pair of normally open contacts connected in parallel with said last mentioned normally closed contacts and in series with said fault detecting relay, a resistance in series with said last mentioned normally open contacts, said operating relay being operatively connected to said last mentioned normally closed contacts and said last mentioned normally open contacts to open the former and close the latter when said operating relay is de-energized, to place said resistance in series with said fault detecting relay when current passes through the latter, whereby said fault detecting relay is adapted to be actuated by relatively low voltage and operate satisfactorily at relatively high voltage.

References Cited in the file of this patent

UNITED STATES PATENTS

| | | |
|---|---|---|
| 2,637,843 | Kammerdiener | May 5, 1953 |

FOREIGN PATENTS

| | | |
|---|---|---|
| 405,614 | Great Britain | Jan. 29, 1934 |
| 427,183 | Great Britain | Apr. 17, 1935 |
| 429,503 | Great Britain | May 23, 1935 |